US011297047B2

(12) United States Patent
Spencer

(10) Patent No.: US 11,297,047 B2
(45) Date of Patent: Apr. 5, 2022

(54) NETWORK COMMUNICATIONS

(71) Applicant: GLOBAL REACH TECHNOLOGY, INC, San Jose, CA (US)

(72) Inventor: Christopher Alan Spencer, London (GB)

(73) Assignee: GLOBAL REACH TECHNOLOGY, INC, San Jose, CA (US)

( * ) Notice: Subject to any disclaimer, the term of this patent is extended or adjusted under 35 U.S.C. 154(b) by 296 days.

(21) Appl. No.: 16/342,251

(22) PCT Filed: Oct. 16, 2017

(86) PCT No.: PCT/GB2017/053129
§ 371 (c)(1),
(2) Date: Apr. 16, 2019

(87) PCT Pub. No.: WO2018/073571
PCT Pub. Date: Apr. 26, 2018

(65) Prior Publication Data
US 2019/0253409 A1    Aug. 15, 2019

(30) Foreign Application Priority Data
Oct. 17, 2016  (GB) .................................... 1617586

(51) Int. Cl.
*H04L 29/06*    (2006.01)
*H04W 12/73*    (2021.01)
(Continued)

(52) U.S. Cl.
CPC ...... *H04L 63/0815* (2013.01); *H04L 63/0876* (2013.01); *H04L 63/0892* (2013.01);
(Continued)

(58) Field of Classification Search
CPC ............ H04L 63/0815; H04L 63/0876; H04L 63/0892; H04L 63/102; H04L 63/108;
(Continued)

(56) References Cited

U.S. PATENT DOCUMENTS 6,856,800 B1 *  2/2005  Henry ................. H04W 12/082
                                                         455/411
9,161,219 B2 *  10/2015 Bryksa .................. G06Q 10/02
(Continued)

FOREIGN PATENT DOCUMENTS

CN          1964576 A      5/2007
EP          2472911         7/2012
(Continued)

OTHER PUBLICATIONS

International Search Report and Written Opinion dated Oct. 17, 2016 in Application No. PCT/BG2017/053130.
(Continued)

*Primary Examiner* — Christopher A Revak
(74) *Attorney, Agent, or Firm* — Niels Haun; Dann, Dorfman, Herrell & Skillman, P.C.

(57) ABSTRACT

Providing authentication servers (e.g. a RADIUS server) combined with a distributed data store (e.g. a memory cache) for storing a time-limited trust relationship message to establish/enable a time-limited trust between the authentication servers during network roaming of a user device. This circumvents the need for the traditional method of synchronous authentication messaging sequences, permitting transmission of authentication messaging sequences in a more time-efficient asynchronous manner.

37 Claims, 6 Drawing Sheets

(51) Int. Cl.
*H04W 12/06* (2021.01)
*H04W 12/08* (2021.01)

(52) U.S. Cl.
CPC .......... *H04L 63/102* (2013.01); *H04L 63/108* (2013.01); *H04W 12/06* (2013.01); *H04W 12/08* (2013.01); *H04W 12/73* (2021.01); *H04L 2463/121* (2013.01)

(58) Field of Classification Search
CPC ................. H04L 2463/121; H04W 12/73; H04W 12/06; H04W 12/08
See application file for complete search history.

(56) References Cited

U.S. PATENT DOCUMENTS

| | | | |
|---|---|---|---|
| 9,167,427 B2* | 10/2015 | Messana | ............... H04W 12/06 |
| 2003/0166397 A1 | 9/2003 | Aura | |
| 2006/0059092 A1 | 3/2006 | Burshan | |
| 2006/0258417 A1 | 11/2006 | Crawford | |
| 2007/0209081 A1 | 9/2007 | Morris | |
| 2008/0240016 A1 | 10/2008 | Cai | |
| 2009/0109941 A1* | 4/2009 | Carter | .................... H04W 8/18 |
| | | | 370/338 |
| 2009/0187983 A1* | 7/2009 | Zerfos | ................. H04L 63/0823 |
| | | | 726/10 |
| 2012/0315901 A1 | 12/2012 | Un | |
| 2013/0024915 A1 | 1/2013 | Jones | |
| 2013/0047218 A1* | 2/2013 | Smith | .................... H04L 63/18 |
| | | | 726/4 |
| 2014/0165147 A1* | 6/2014 | Hershberg | .......... H04L 63/0823 |
| | | | 726/4 |
| 2014/0185597 A1 | 7/2014 | Gupta | |
| 2015/0089592 A1 | 3/2015 | Han | |
| 2015/0264051 A1 | 9/2015 | Hoggan | |
| 2015/0302483 A1 | 10/2015 | Wilson, V | |
| 2016/0036794 A1 | 2/2016 | Adhya | |
| 2016/0080351 A1 | 3/2016 | Chu | |

FOREIGN PATENT DOCUMENTS

| | | |
|---|---|---|
| JP | 2010282351 | 12/2010 |
| WO | 2014046880 | 3/2014 |
| WO | 2015073757 | 5/2015 |

OTHER PUBLICATIONS

Haidong Xia and Jose Brustoloni Department of Computer Science, University of Pittsburgh; Virtual Prepaid Tokens for Wi-Fi Hotspot Access; Department of Computer Science, University of Pittsburgh; Proceedings of the 29th Annual IEEE International Conference on Local Computer Networks.
Combined Search and Exam Report for App. No. GB1617587.9 dated Nov. 14, 2017.
Combined Search and Exam Report for App. No. GB1617586.1 dated Dec. 1, 2017.
International Search Report and Written Opinion dated Jul. 6, 2018 in Application No. PCT/GB2018/05141 0.
Office Action in corresponding application in China dated Apr. 6, 2021 with brief translation of the rejections.

* cited by examiner

NETWORK COMMUNICATIONS

PRIORITY APPLICATIONS

This application is a 371 application of International Application No. PCT/GB2017/053129 filed Oct. 16, 2017, which claims priority to United Kingdom Patent Application No. 1617586.1 filed Oct. 17, 2016. Each of the foregoing applications is hereby incorporated herein by reference.

FIELD

The invention relates to network communications methods and apparatus for communications via different networks during data roaming.

BACKGROUND

A communications network typically permits users access to it via a network access point, or gateway. In many networks, such as public networks (e.g. the Internet) a user may be required to provide access credentials to the network access point before being permitted to access certain network services/websites etc. Only after these credentials have been verified by an authentication server/software, connected to the access point (or provided within it), is network access granted to the user. A 'captive portal' technique is a common mechanism for implementing a process of authentication for network access control.

A network access request, using a captive portal, typically proceeds as follows, and as schematically illustrated in FIG. 1A, FIG. 1B and FIG. 1C. A client/user activates their web browser to gain access to a desired network service (e.g. http://webpage.com/). They are directed to the captive portal (FIG. 1A) where credentials are requested (e.g. password, user name etc.). The entered credentials are forwarded to a network access point (AP) or gateway, where they are checked/inspected (FIG. 1B). Access to anything but the captive portal is prevented until/unless the user's credentials are verified. After the credentials are verified by the AP, using a RADIUS protocol for example, the user's computer receives a DHCP (Dynamic Host Configuration Protocol) lease enabling access to the network as requested (FIG. 1C). The user may then access the network as desired (e.g. the Internet). Captive portals use the MAC or IP address of the client device as a unique identifier for that device.

The RADIUS Protocol

The RADIUS protocol (Remote Authentication Dial In User Service) is an industry standard protocol for authentication, authorization, and accounting (AAA). RADIUS is often the backend of choice for 802.1X authentication. Terminal servers or Network Access Server (NAS) use the RADIUS protocol to communicate AAA requests to, and return results from, a database of customer information. The RADIUS protocol may be defined in Internet Engineering Task Force (IETF) "RFC" documents, such as RFC 2058 and any one or more of the subsequent RFC documents which have obsoleted RFC 2058 and/or have themselves been obsoleted by successive RFC documents defining the RADIUS protocol (or aspects of it), such as any one of, or a combination of, RFC 3579, RFC 2866 and RFC 3580 or may be used RFC 6614 for example.

A RADIUS server uses the RADIUS protocol to provide AAA services. A RADIUS server performs AAA services required when customers use a terminal server or Network Access Server (NAS). The RADIUS server performs the following tasks:

Authentication: Verifying a customers identity by checking the user name and password Authorization: Verifying a customers privileges for accessing the requested services Accounting: Tracking when customers log in and log out, and the duration of the sessions.

The term "Accounting" refers to tracking customer usage.

A common authentication tool is to use a so-called "captive portal". A captive portal uses a standard web browser to permit a user the opportunity to present login details/credentials to a network service, before access to that service is granted. The use of a web browser in this way means that many personal computer operating systems (laptops, PCs etc.) can support captive portals, and bespoke software is not required.

When a RADIUS server is used for authentication purposes, it may return one of two responses to the network access point: an 'Access Reject' response; or an 'Access Accept' response. An 'Access Reject' response occurs to deny access to the requested network resources if the user has failed to provide acceptable credentials. An 'Access Accept' response occurs when a user is granted access.

RADIUS has the ability to enable RADIUS messages to be proxied (i.e. transmitted via a proxy server) to other RADIUS servers. This means that it becomes possible for a user of a first network (network A) to gain access to a second network (network B) by authenticating on the RADIUS server of the second network (network B). That is to say, the RADIUS authentication request at the first network may be proxied to another network employing RADIUS, to allow the user access to that other network.

When the RADIUS server of the first network (network A) receives an access/authentication request from a user desiring access to a second network (network B), connected to the first network, that request may be forwarded (proxied) to the RADIUS server of the second network (network B), instead of verifying the credentials of the user locally (at network A). The RADIUS server of the second network (network B) may then verify the user's credentials and send back to the RADIUS server of the first network, an 'access accept' message regarding the user's access request, thereby allowing access to the second network via the first network. This is known a 'federated access'.

A RADIUS proxy is a device arranged to forward or route RADIUS connection requests and accounting messages between RADIUS clients (and RADIUS proxies) and RADIUS servers (or RADIUS proxies). The RADIUS proxy uses information within the RADIUS message, such as the User-Name or Called-Station-ID RADIUS attributes, to route the RADIUS message to the appropriate RADIUS server. A RADIUS proxy can be used as a forwarding point for RADIUS messages when the authentication, authorization, and accounting must occur at multiple RADIUS servers in different networks, locations or organizations. RADIUS is commonly used to facilitate roaming between internet service providers (ISP), for example by companies which provide a single global set of credentials that are usable on many public networks.

FIG. 2 schematically illustrates the use of a RADIUS proxy server in connection with a captive portal, for providing AAA services using a remote RADIUS server accessible via an internet connection. The captive portal is provided to the user equipment (UE) from network access server (NAS), in response to the UE requesting access to internet services via a wireless network access point (AP). This arrangement permits network roaming by the UE in order to allow access to the internet services via different APs in different networks encountered due to the UE roaming to different locations.

Traditionally, a sequence of messages transmitted and received during the process of authenticating a UE, made against a credential record in a RADIUS server, must traverse one or more networks (public or private) in order to reach the RADIUS server to which the UE is registered. A problem arises when there is a large geographical distance between the physical location of the UE and the physical location of the authenticating RADIUS server (for example, providing a wireless network carrier's AAA). FIG. 3 schematically illustrates a typical network messaging flow for such an authentication request. The vertical dashed line indicated by "(1)" in FIG. 1, positioned between the "local RADIUS" server and the "Carrier AAA" (i.e. a remote RADIUS server) identifies where message delays occur in a typical roaming RADIUS network. These delays adversely affect user experience.

For example, if the remote RADIUS server is half way around the world, relative to the local RADIUS server, then with an average one-way data packet trip time taking about 500 ms, the cumulative RADIUS messaging time may reach up to about 3 seconds. This is because, when a UE roams into a new network requiring re-connection to a remote network service, typically six (6) synchronous RADIUS authentication messages (Access Request; Access Reject; Access Request; Access Accept; Accounting Start; Accounting Response) must be exchanged (sent and received) before the UE is allowed to authenticate and gain (e.g. regain) access to the desired network services served by the RADIUS server.

Indeed, when a secure network authentication is employed, such as the Extensible Authentication Protocol (EAP) is used, or a protocol that encapsulates EAP within an encrypted and authenticated Transport Layer Security (TLS) tunnel, such as an Authentication Protocol Tunneled Transport Layer Security Authenticated Protocol (EAP-TTLS), such protocols require an authentication request as the UE roams across access points, then the harm to the user experience is extremely noticeable.

Referring to FIG. 3, here is shown a schematic representation of a network access messaging sequence according to an existing method. The messaging sequence of FIG. 3 may be implemented between the client device and the RADIUS server of a network. Initially, at step S1, the client device (UE) sends an 'Open Association' message to the network Access Point/gateway of the local network. The Access Point reacts to this by transmitting an 'Access Request' message to the local RADIUS server (B) of the second network which reacts by returning an 'Access Reject' message, meaning that authentication is required.

At steps S3 to S6, the client device (UE) performs well-known DHCP and HTTP messaging sequences with the local DHCP server, the network Access Point and the local Captive Portal according to known techniques such as those discussed with reference to FIG. 1A to 1C, above. These include, at step S3, a sequence of DHCP: 'Discovery; 'Offer'; 'Request'; 'Acknowledgement', messages between the UE messages the local DHCP server. At step S4, the UE messages the local network Access Point which responds by redirecting the UE to a captive portal, and step S5. At step S7, the Access Point of the local network receives an authentication request from the client device (UE) and, in reaction to that, at step S8, an ACCESS-ACCEPT message is issued to the Access Point of the local network from the RADIUS server of the carrier network (Carrier AAA) via the RADIUS server of the local network.

The ACCESS-ACCEPT messaging sequence between the Access Point and the RADIUS server of the carrier network, comprises steps S9 and S10, involving a messaging sequence comprising the ACCOUNTING-START, at step S9, and ACCOUNTING-RESPONSE, at step S10, in much the same way as the ACCESS sequence. However, latency between a local RADIUS server of a local network, and the upstream carrier RADIUS server (AAA) of a remote network, results from the fact that the messaging sequence at step (S12), between local RADIUS server upstream carrier RADIUS server, must be conducted synchronously (i.e. one following only after the other is fully completed). This holds-up authentication requests.

The invention addresses these matters.

SUMMARY

At its most general the invention resides in the idea of providing authentication servers (e.g. a RADIUS server) combined with a distributed data store (e.g. a memory cache) for storing a time-limited trust relationship message to establish/enable a time-limited trust between the authentication servers during network roaming of a user device. This circumvents the need for the traditional method of synchronous authentication messaging sequences, permitting transmission of authentication messaging sequences in a more time-efficient asynchronous manner.

In a first aspect, the invention may provide a method for authenticating a client device in a communications network amongst a plurality of communications networks, including: providing a first authentication server apparatus in a first communications network and a further authentication server apparatus at each one of a plurality of respective further communications networks; storing in a first data store, by the first authentication server apparatus, a client identity data item identifying the client device and an expiry data item identifying an expiry time associated with the client identity data item, and transmitting the client identity data item and the expiry data item to the further authentication server apparatus of each of the further communications networks; storing in a further data store, by each further authentication server apparatus, the received client identity data item and expiry data item and deleting the stored client identity data item from the further data store upon expiry of a time period defined by the expiry data item; receiving, by any given said further authentication server apparatus, a request from the client device for access to the first communications network and, on condition that the client identity data item remains stored in the further data store thereof, authenticating the client device by performing authentication communications with the first authentication server apparatus asynchronously with respect to authentication communications with the client device.

In this way, when a client device uses an access point in one of the further networks, in order to access a service provided by a server in the first network, it may roam to another of the further networks whilst continuing to require the services it is authorised to access on/from the first network. Such access was previously gained via the prior one of the further networks and may then be gained via the new/other of the further networks. A network access request may be issued from client device to the authentication server of the other of the further networks, for access to the first communications network. When the authentication server of the other of the further networks receives this access request, it may check for the presence of the client identity data item to see if it remains stored in its data store. If the client identity data item remains stored, the authentication server of the other of the further networks, may automatically grant access to the first network.

In order to authenticate the client device, the authentication server of the other of the further networks may perform authentication communications with the authentication server of the first network asynchronously with respect to authentication communications with the client device. The authentication communications with the authentication server of the first network may include, for example, transmitting/receiving an Access Request communication/an Access Accept communication, and/or transmitting/receiving an Accounting Start communication/an Accounting Response communication. These communications may be conducted asynchronously with respect to parallel authentication communications with the client device, which may include receiving/transmitting, at/from the authentication server of the other of the further networks, an Access Request communication/an Access Accept communication/an Accounting Start communication/an Accounting Response communication.

Because this sequence of authentication communications between the authentication server of the other of the further networks and the authentication server of the first network, are asynchronous with authentication communications between the authentication server of the other of the further networks and the user device, this means that the user device may send/receive authentication messages without requiring the coordination of the authentication server of the first network. This means that such authentications messages may be sent and received in a more rapid succession because they are not required to occur in strict, synchronous succession. A sender apparatus (e.g. user device, or authentication server) is not required to coordinate with the ultimate receiver device (e.g. authentication server, or user device) before sending one of the sequence of authentication messages. Synchronous messaging, as is used in prior authentication messaging sequences when implementing an authentication protocol requires such coordination, and this leads to delays in completing authentication messaging sequences.

The authentication server(s) may comprise a server-class computer(s), or may comprise software adapted to implement the functions of an authentication server when executed on a computer programmed to execute the software. The data store(s) may include a computer(s) and a digital memory device(s) and software arranged on the computer(s), or arranged for implementation/execution on such a computer(s), to manage the contents and entries in the digital memory store/read/retrieve/delete such contents as desired. The data store may be a cache. The data store may be a 'Memory Cache'. For example, when the software of the data store is running, it may be arranged to cache data in the system memory, or RAM. For example, the software may be arranged to cache/store entries for client identity data items and expiry data items into RAM. Since RAM can be accessed much more quickly than a hard drive, this reduces lag when importing and retrieving files. An authentication server may comprise, or be in controlling communication with, a respective data store for this purpose.

The method may include receiving, by the given further authentication server apparatus, a password from the user device, wherein: if the client identity data item remains stored in the further data store the authenticating the client device is not conditional upon verification of the password; and if the client identity data item does not remain stored in the further data store the authenticating the client device is conditional upon verification of the password.

The authenticating of the client device may include performing authentication communication according to a RADIUS protocol (Remote Authentication Dial In User Service). The RADIUS protocol may be defined in Internet Engineering Task Force (IETF) "RFC" documents. A Request for Comments (RFC) document is a type of publication from the Internet Engineering Task Force (IETF) and the Internet Society, the principal technical development and standards-setting bodies for the Internet. An example is such as RFC 2058 and any one or more of the subsequent RFC documents which have obsoleted RFC 2058 and/or have themselves been obsoleted by successive RFC documents defining the RADIUS protocol (or aspects of it), such as RFC 6614 for example. In preferred embodiments, a RADIUS protocol according to any one of, or a combination of, RFC 3579, RFC 2866 and RFC 3580 may be used. However, the invention is not limited to this selection/combination. In alternative arrangements, the "Diameter" protocol may be used. The "Diameter" protocol is an authentication, authorization, and accounting protocol for computer networks. It evolved from the RADIUS protocol that preceded it. The Diameter base protocol may be defined in RFC 6733, or in any RFC document for Diameter preceding RFC 6733 (e.g. obsoleted by it), or in any RFC document for Diameter succeeding RFC 6733 (e.g. which it may obsolete).

The authentication communications with the first authentication server apparatus may include transmitting an Access Request communication to the first authentication server apparatus and receiving an Access Accept communication from the first authentication server. Alternatively, or additionally, the authentication communications with the first authentication server apparatus may include transmitting an Accounting Start communication to the first authentication server apparatus and receiving an Accounting Response communication from the first authentication server. Alternatively, or additionally, the authentication communications with the client device include receiving an Access Request communication from the client device and transmitting an Access Accept communication to the client device. Alternatively, or additionally, the authentication communications with the client device include receiving an Accounting Start communication from the client device and transmitting an Accounting Response communication to the client device.

The client identity data item may comprise any one or more of: a username; a Calling-Station-Id; a Chargeable User Identity (CUI).

A Calling-Station-Id may be, for example, defined according to a RADIUS Attribute (defined by the Internet Engineering Task Force (IETF)). This allows a network access server to include the telephone number from which a call came, as part of the Access-Request packet (using Automatic Number Identification or similar technology). Other examples include: a service name; an IP address.

For example, CUI may be specified in RFC 4372, or in any RFC document for CUI preceding RFC 4372 (e.g. obsoleted by it), or in any RFC document for CUI succeeding RFC 4372 (e.g. which it may obsolete). A CUI is a unique identifier for a user which remains static for a given user visiting a given site.

The expiry data item may comprise any one or more of: a value representing a time or time point; a value representing date; an interval of time. The time period defined by the expiry data item may be a time period ending at the time value or time point defined by the expiry data item itself. For example, the expiry data item may comprise a numerical or alpha-numerical time and/or date value (e.g. 18:00 hrs GMT; or, 31 Dec. 2016 23:59:59 GMT) defining the expiry time according to an objective time-frame (i.e. Greenwich Mean Time, GMT), or a numerical time interval/period (e.g. 2.0 hours; 120 mins etc.) defining an interval of time immediately after which expiry of the time period is to occur. The further authentication server apparatus may be arranged to start the time period at/from the time the further authentication server apparatus receives/stores the expiry data item. For example, the further authentication server apparatus may receive/store, at time T1, an expiry data item comprising:

(a) time value "18:00 hrs GMT", and the further authentication server apparatus may be arranged to delete the (stored) client identity data item after a time period defined by (18:00—T1) hrs GMT; or, (b) time value, such as a date which may also include a time in hrs:mins:sec, e.g. "31 Dec. 2016 23:59:59 GMT", and the further authentication server apparatus may be arranged to delete the (stored) client identity data item after a time period defined by (31 Dec. 2016 23:59:59—T1) GMT, or, (c) time value, which may include a time minutes, e.g. "120 mins", and the further authentication server apparatus may be arranged to delete the (stored) client identity data item after a time period defined by (120—T1) mins.

The time value may comprise a timestamp or other time message/value, which may be a numeric time and/or numeric or alphanumeric date value (e.g. referred to hereafter as a Time-to-Forget (TTF) time value). The time value may comprise a time value, which may be a numeric time (e.g. in minutes) and/or numeric or alphanumeric date value which defines how long the further authentication server apparatus must allow/wait/provide for performing the authentication communications with the first authentication server apparatus, asynchronously with respect to authentication communications with the client device (e.g. referred to hereafter as a Time-to-Renew (TTR) time value).

The expiry data item may comprise both a Time-to-Forget (TTF) time value and a Time-to-Renew (TTR) time value. The process of deleting may include deleting the stored client identity data item from the further data store upon expiry of a time period(s) defined by either one of, or both/each of: the Time-to-Forget (TTF) time value; the Time-to-Renew (TTR) time value.

For example, a further authentication server apparatus may be arranged to delete a stored client identity data item from its data store upon expiry of the shorter time period from amongst the time period defined by the Time-to-Forget (TTF) time value and the Time-to-Renew (TTR) time value. For example, the further authentication server apparatus may receive/store, at time T1, an expiry data item comprising a TTF time value, such as a date/time e.g. "31 Dec. 2016 23:59:59 GMT", and a TTR time value, such as a time period in minutes, e.g. "120 mins". The further authentication server apparatus may be arranged to delete the (stored) client identity data item after a time period defined by the shorter of the two time periods: (31 Dec. 2016 23:59:59—T1) GMT, and (120—T1) mins, i.e. whichever one of these two expires first.

The first authentication server apparatus may be arranged to identify/distinguish a TTF time value from a TTR time value of an expiry data item within the client identity data item, and the further authentication server apparatus may be arranged to identify/distinguish between a TTF time value and a TTR time value from a received client identity data item, accordingly.

Authentication messaging/transmissions and data transmissions to and from the data store(s) of the authentication servers may be protected in transit via a suitable security software and/or protocol. For example, an Internet Protocol Security (IPsec) protocol may be used. IPsec is a protocol suite for secure Internet Protocol (IP) communications that works by authenticating and encrypting each IP packet of a communication session, as is well known and available to the skilled person. IPsec protocols were originally defined in RFC 1825 through RFC 1829, which were superseded by RFC 2401 and RFC 2412. New standards were defined in RFC 4301 and RFC 4309, for example.

In a second aspect, the invention may provide a network communications apparatus for authenticating a client device in a communications network amongst a plurality of communications networks, including a first authentication server apparatus in a first communications network arranged in network communication with a further authentication server apparatus in each one of a plurality of respective further communications networks.

A first data store is arranged in network communication with the first authentication server apparatus arranged for storing a client identity data item identifying the client device and an expiry data item identifying an expiry time associated with the client identity data item, the first authentication server apparatus being arranged to transmit the client identity data item and the expiry data item to the further authentication server apparatus of each of the further communications networks.

A plurality of further data stores are arranged in network communication with a respective further authentication server apparatus for storing a client identity data item and expiry data item transmitted from the first authentication server apparatus, each further authentication server apparatus being arranged for deleting a stored client identity data item from the respective further data store upon expiry of a time period defined by the expiry data item.

Each said further authentication server apparatus is operable to receive a request from the client device for access to the first communications network and, on condition that the client identity data item remains stored in the further data store thereof, to authenticate the client device by performing authentication communications with the first authentication server apparatus asynchronously with respect to authentication communications with the client device.

Each further authentication server apparatus may be arranged to receive a password from the user device, wherein: if the client identity data item remains stored in the further data store the authenticating the client device is not conditional upon verification of the password; and, if the client identity data item does not remain stored in the further data store the authenticating the client device is conditional upon verification of the password.

The process of authenticating the client device may include performing authentication communications according to an AAA (Authentication, Authorisation and Accounting) protocol or a RADIUS protocol (Remote Authentication Dial In User Service).

The authentication communications with the first authentication server apparatus may include transmitting an Access Request communication to the first authentication server apparatus and receiving an Access Accept communication from the first authentication server. Alternatively, or additionally, the authentication communications with the first authentication server apparatus may include transmitting an Accounting Start communication to the first authentication server apparatus and receiving an Accounting Response communication from the first authentication server. Alternatively, or additionally, the authentication communications with the client device may include receiving an Access Request communication from the client device and transmitting an Access Accept communication to the client device. Alternatively, or additionally, the authentication communications with the client device include receiving an Accounting Start communication from the client device and transmitting an Accounting Response communication to the client device.

The client identity data item may comprises any one or more of: a username; a calling-station-ID.

The expiry data item may comprise any one or more of: a value representing a time or time point; a value representing date; an interval of time. The time period defined by the expiry data item may be a time period ending at the time value or time point defined by the expiry data item itself. The further authentication server apparatus may be arranged to start the time period at/from the time the further authentication server apparatus receives/stores the expiry data item.

The time value may comprise a timestamp or other time message/value, which may be a numeric time and/or numeric or alphanumeric date value (e.g. referred to hereafter as a Time-to-Forget (TTF) time value—this may be implemented as RADIUS protocol 'attribute'). The time value, which may be a numeric time (e.g. in minutes) and/or numeric or alphanumeric date value, may define how long the further authentication server apparatus must allow/wait/provide for performing the authentication communications with the first authentication server apparatus, asynchronously with respect to authentication communications with the client device (e.g. referred to hereafter as a Time-to-Renew (TTR) time value—this may be implemented as RADIUS protocol 'attribute').

The expiry data item may comprise both a Time-to-Forget (TTF) time value and a Time-to-Renew (TTR) time value. The process of deleting may include deleting the stored client identity data item from the further data store upon expiry of a time period(s) defined by either one of, or both/each of: the Time-to-Forget (TTF) time value; the Time-to-Renew (TTR) time value. For example, a further authentication server apparatus may be arranged to delete a stored client identity data item from its data store upon expiry of the shorter time period from amongst the time period defined by the Time-to-Forget (TTF) time value and the Time-to-Renew (TTR) time value. The first authentication server apparatus may be arranged to identify/distinguish a TTF time value from a TTR time value of an expiry data item within the client identity data item, and the further authentication server apparatus may be arranged to identify/distinguish between a TTF time value and a TTR time value from a received client identity data item, accordingly.

The authentication servers may be arranged to protect authentication messaging/transmissions and data transmissions to and from the data store(s) of the authentication servers via a suitable security software and/or protocol. For example, an Internet Protocol Security (IPsec) protocol may be used.

In a further aspect, the invention may provide a network communications apparatus for authenticating a client device in a communications network amongst a plurality of communications network access points, including: a first authentication server apparatus for a first communications network adapted and arranged for network communication with a further authentication server apparatus for each one of a plurality of respective further communications network access points; a first data store arranged in network communication with the first authentication server apparatus arranged for storing a client identity data item identifying the client device and an expiry data item identifying an expiry time associated with the client identity data item for use in deleting the client identity data item from a further data store upon expiry of a time period defined by said expiry data item, the first authentication server apparatus being arranged to transmit the client identity data item and the expiry data item to a said further authentication server apparatus of each of said further communications network access points for storage in a said further data store thereof; wherein the first authentication server is arranged to authenticate the client device via a said further authentication server apparatus by performing authentication communications with the further authentication server apparatus asynchronously with respect to authentication communications between the client device and the further authentication server while said client identity data item remains stored in the further data store thereof. Thus, a user/client device may roam to the (e.g. local) access point served by a further authentication server and seek access to resources provided via authentication administered by the first (e.g. remote) authentication server.

The authenticating the client device may be arranged to perform authentication communications according to an AAA (Authentication, Authorisation and Accounting) protocol or a RADIUS protocol (Remote Authentication Dial In User Service). The client identity data item may comprise any one or more of: a username; information identifying the client device (e.g. a calling-station-ID). The expiry data item may comprise a first time value which defines how much time the further authentication server apparatus must provide for performing the authentication communications with the first authentication server apparatus, asynchronously with respect to authentication communications with the client device. The expiry data item may comprise a second time value which defines when the further authentication server apparatus must delete the stored client identity data item from the further data store thereof.

In a yet further aspect, the invention may provide a network communications apparatus for authenticating a client device in a communications network amongst a plurality of communications network access points, including: a first authentication server apparatus for a communications network access point adapted and arranged for network communication with a second authentication server apparatus for a second communications network access point; a data store arranged in communication with the first authentication server apparatus and arranged for storing a client identity data item identifying the client device and an expiry data item identifying an expiry time associated with the client identity data item, the first authentication server apparatus being arranged for deleting a stored client identity data item from the data store upon expiry of a time period defined by said expiry data item; the first authentication server apparatus is arranged to receive the client identity data item and the expiry data item transmitted from said second authentication server apparatus for storage in said data store; wherein the first authentication server is arranged to obtain authentication of the client device via said second authentication server apparatus by performing authentication communications with the second authentication server apparatus asynchronously with respect to authentication communications between the client device and the first authentication server while said client identity data item remains stored in the data store. Thus, a user/client device may roam to the first (e.g. local) access point served by the first authentication server and seek access to resources provided via authentication administered by the second (e.g. remote) authentication server.

The first authentication server apparatus may be arranged to receive a password from the user device, wherein: if said client identity data item remains stored in the data store said authenticating the client device is not conditional upon verification of the password; and if said client identity data item does not remain stored in the data store said authenticating the client device is conditional upon verification of the password. The process of authenticating the client device may include performing authentication communications according to an AAA (Authentication, Authorisation and Accounting) protocol or a RADIUS protocol (Remote Authentication Dial In User Service). The client identity data item may comprise any one or more of: a username; information identifying the client device (e.g. a calling-station-ID).

The expiry data item may comprise a first time value which defines how much time the first authentication server apparatus must provide for performing the authentication communications with the second authentication server apparatus, asynchronously with respect to authentication communications with the client device. The expiry data item may comprise a second time value which defines when the first authentication server apparatus must delete the stored client identity data item from the data store thereof. The process of deleting may include deleting the stored client identity data item from the further data store upon expiry of a time period defined by either one of, or both of: the first time value; the second time value.

In a further aspect, the invention may provide a computer program product, or data carrier/store containing a computer program including instructions executable on a computer(s) to implement the method as described above.

In a further aspect, the invention may provide one or more computers programmed with computer program including instructions arranged, when executed, to implement the method described above.

In a further aspect, the invention may provide network of computers programmed with a computer program including instructions arranged, when executed, to implement the method described above.

DESCRIPTION OF EMBODIMENTS

Figure 5:
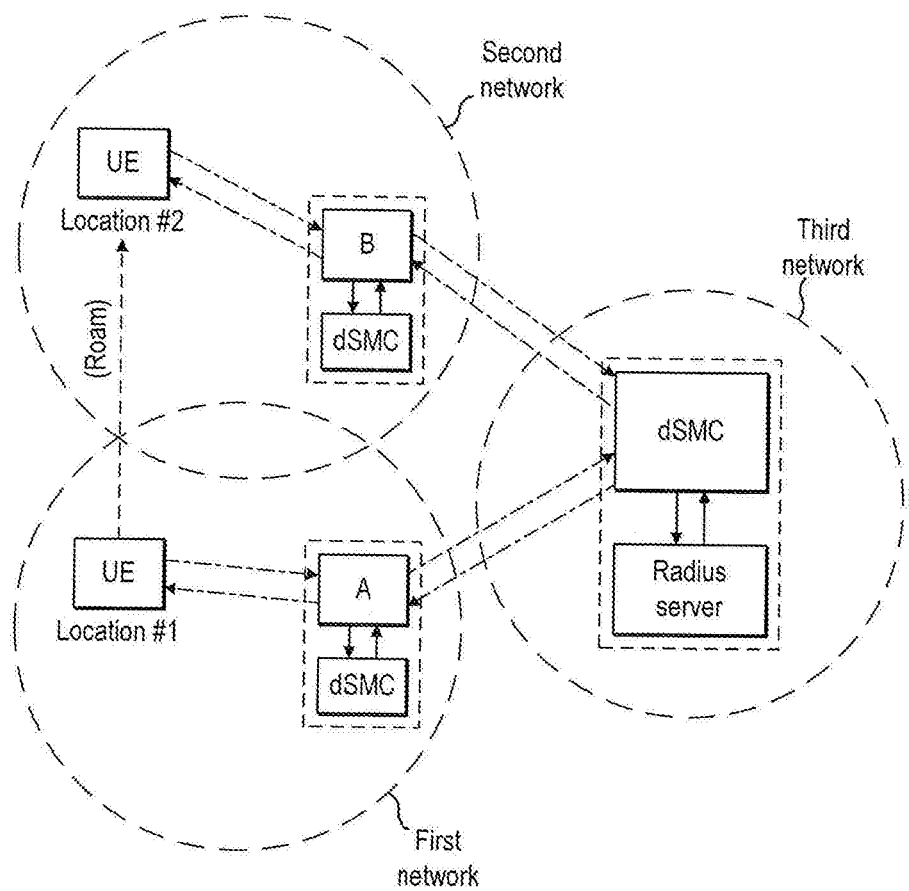
FIG. 5 schematically illustrates a network communications apparatus according to an embodiment of the invention for use in authenticating a network-roaming user device.

FIG. 5 schematically illustrates a network communications apparatus for authenticating a client device (user equipment, UE) in a third communications network amongst a plurality of communications networks including a first network, a separate second network and a separate third network. The client device UE is initially located at a first location (location #1) within a first network and accesses network services available on the third network via the first network. The third network contains a first authentication server apparatus (e.g. any suitable AAA server, e.g. a RADIUS server in this example) arranged in network communication with the first network, and with the second network. Each of the first and second networks contains a respective RADIUS authentication server (RADIUS server 'A' in the first network; RADIUS server B' in the second network) each arranged to communicate with the RADIUS server of the third network. The RADIUS server 'A' and the RADIUS server B' each act as proxy servers to proxy (transmit) to the RADIUS server of the third network the authentication requests they receive on their local networks.

The RADIUS server of the third network is in communication with a first data store which is part of a distributed, secure memory cache (dSMC) and is arranged for storing a client identity data item identifying the client device (UE) together with an expiry data item identifying an expiry time associated with the client identity data item. The expiry data item may comprise any one or more of: a Time-to-Forget (TTF) time stamp—i.e. the period ends at the TTF; a Time-to-Renew (TTR) numeric value—i.e. the period ends at the TTR. The TTF and TTR are implemented as new RADIUS 'attributes' compliant with the RADIUS protocol regarding attributes.

The RADIUS server of the third network is arranged to transmit the client identity data item and the expiry data item to the RADIUS servers (A and B) of each of the first and second communications networks.

Each of the RADIUS servers (A and B) of the first and second communications networks are also arranged in network communication with respective further data store which is part of the distributed, secure memory cache (dSMC), and each is also arranged for storing the client identity data item identifying the client device (UE) together with the expiry data item identifying an expiry time associated with the client identity data item, when this is received from the RADIUS server of the third network. In this way, the data stores of the first, second and third communications networks collectively define the distributed aspect of the dSMC.

Each of the RADIUS servers (A and B) of the first and second communications networks is arranged to delete a received/stored client identity data item from its associated data store (dSMC) upon expiry of a time period defined by the expiry data item. The client identity data item may comprise any one or more of: a username; a calling-station- ID. The time period may be defined by either one of, or both of: a Time-to-Forget (TTF) time stamp; a Time-to-Renew (TTR) numeric value.

When a client device (UE) roams from location #1 in the first network to location #2 in the second network, whilst in network communication with the third network and the services it is authorised to access there, it requires continued access to the third network and its services. However, such access was previously gained via the first network, and must now be gained via the second network. A request for access to the third network must therefore be places at the RADIUS server of the third network, from the RADIUS server of the second network.

To this end, a network access request must be issued from client device to the RADIUS server of the second network, for access to the third communications network. When the RADIUS server of the second network receives this access request, it checks for the presence of the client identity data item remains stored in its dSMC data store. If the client identity data item remains stored, the RADIUS server is arranged to automatically grant access to the third network, but only on condition that the client identity data item remains stored in the dSMC data store.

The RADIUS server of the second (and first) network is also arranged to receive a password from the user device, as part of the process of network access authentication (e.g. 'captive portal' model). If the client identity data item remains stored in the dSMC data store, then authentication of the client device occurs without the need for verification of the password. However, if the client identity data item does not remain stored in the dSMC data store, then authentication of the client device becomes conditional upon verification of the password.

In order to authenticate the client device (UE), the RADIUS server of the second network performs authentication communications with the RADIUS server of the third network asynchronously with respect to authentication communications with the client device (UE). The authentication communications with the RADIUS server of the third network include transmitting an Access Request communication to the RADIUS server of the third network and receiving an Access Accept communication from the RADIUS server of the third network. Additionally, the authentication communications with the RADIUS server of the third network include transmitting an Accounting Start communication to the RADIUS server of the third network and receiving an Accounting Response communication from the RADIUS server of the third network.

These communications are conducted asynchronously with respect to parallel authentication communications with the client device (UE). These include receiving, at the RADIUS server of the second network, an Access Request communication from the client device and transmitting, from the RADIUS server of the second network, an Access Accept communication to the client device. Additionally, the authentication communications with the client device include receiving, at the RADIUS server of the second network, an Accounting Start communication from the client device and transmitting, from the RADIUS server of the second network, an Accounting Response communication to the client device.

Because this sequence of authentication communications between the RADIUS server of the second network and the RADIUS server of the third network are asynchronous with authentication communications between the RADIUS server of the second network and the user device (UE), this means that the user device (UE) may send authentication messages without requiring the coordination of the RADIUS server of the third network. This means that such authentications messages may be sent and received in a more rapid succession because they are not required to occur in strict, synchronous succession. A sender apparatus (e.g. user device (UE), or RADIUS server) is not required to coordinate with the ultimate receiver device (e.g. RADIUS server, or user device (UE)) before sending one of the sequence of authentication messages. Synchronous messaging, as is used in prior authentication messaging sequences when implementing a RADIUS protocol (or other relevant protocol) requires such coordination, and this leads to delays in completing authentication messaging sequences. Latency of authentication messages all the way back to a home server disrupts a fast roaming experience when roaming across multiple access points within each network as well.

Authentication messaging/transmissions and data transmissions to and from the dSMC data store(s) of the three authentication servers are protected in transit via an Internet Protocol Security (IPsec) protocol. This protocol provides secure Internet Protocol (IP) communications and works by authenticating and encrypting each IP packet of a communication session, as is well known and available to the skilled person. In this way, the three inter-connected/communicating dSMC data stores of the three networks provide a distributed memory cache which is secure. It allows a user device (UE) to roam between access points in different networks, or to roam between different access points within the same network such as if location #1 and location #2 of FIG. 5 were both locations within the first network.

Figure 6:
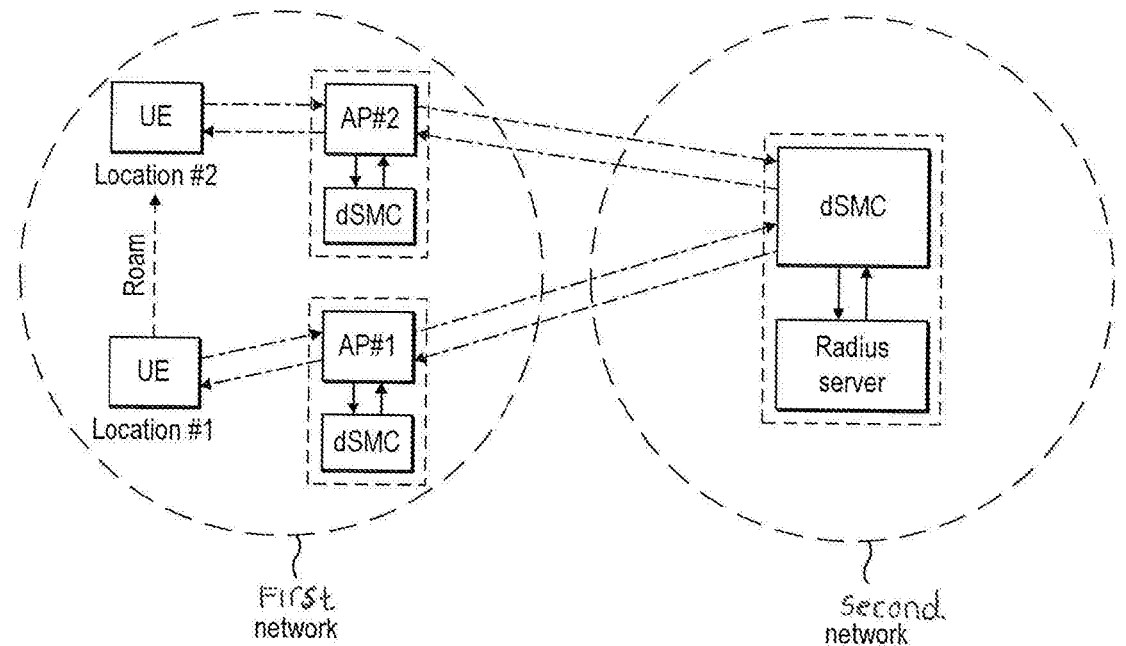
FIG. 6 schematically illustrates a network communications apparatus according to an embodiment of the invention for use in authenticating an Access-point-roaming user device.

For example FIG. 6 schematically shows an alternative implementation very similar to that described above with reference to FIG. 5, in which the Radius servers (A and B) of the 'first network' and the 'second network', respectively, are two separate network access points "AP #1' and AP #2', respectively, within the same one 'first network'. In that example, the client device (UE) roams from the first access point to the second access point. The implementation of the invention in the example of FIG. 6 is as described with reference to FIG. 5, but concerns roaming within one network, rather than between networks.

Figure 7:
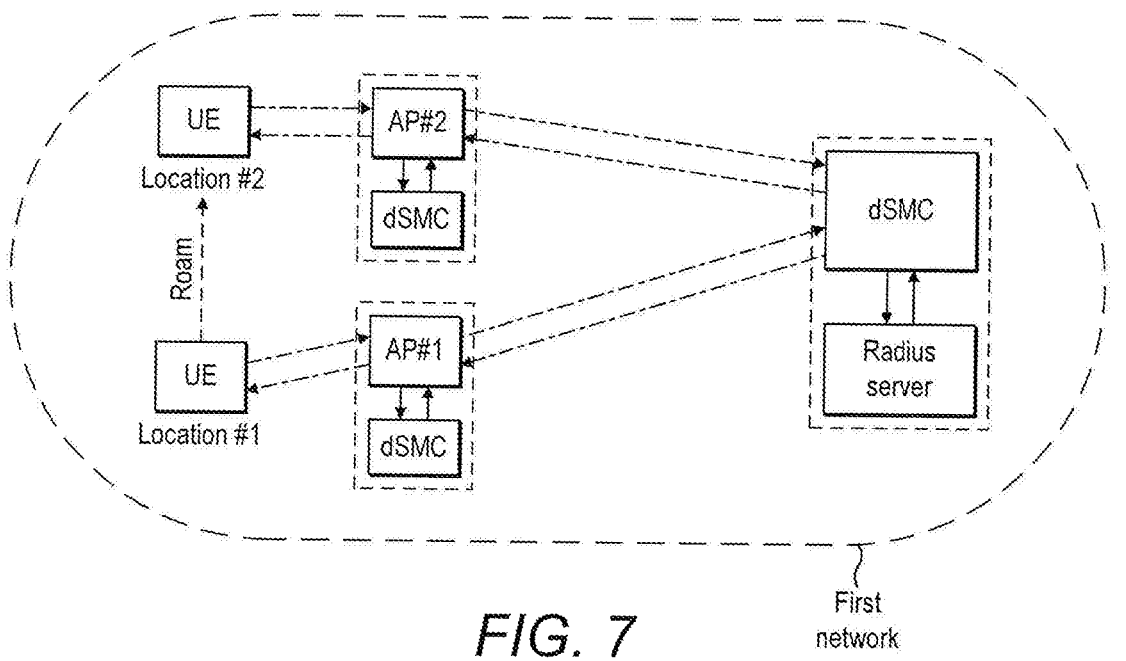
FIG. 7 schematically illustrates a network communications apparatus according to an embodiment of the invention for use in authenticating an Access-point-roaming user device.

In a further example, FIG. 7 schematically shows an alternative implementation very similar to that described above with reference to FIG. 5, and FIG. 6, in which the Radius servers (A and B) of the 'first network' and the 'second network', respectively, are two separate network access points "AP #1' and AP #2', respectively, within the same one 'first network'. The 'RADIUS server' of the 'second network' of FIG. 6 is, in this example, now (instead) within the 'first network', such that the proxy RADIUS servers ('AP #1', 'AP #2') and the RADIUS server from which the client identity data item and expiry data item originate, are all within the same 'first network'. In that example, the client device (UE) roams from the first access point to the second access point. The implementation of the invention in the example of FIG. 7 is as described with reference to FIG. 5, but concerns roaming within one network, rather than between networks.

Figure 4:
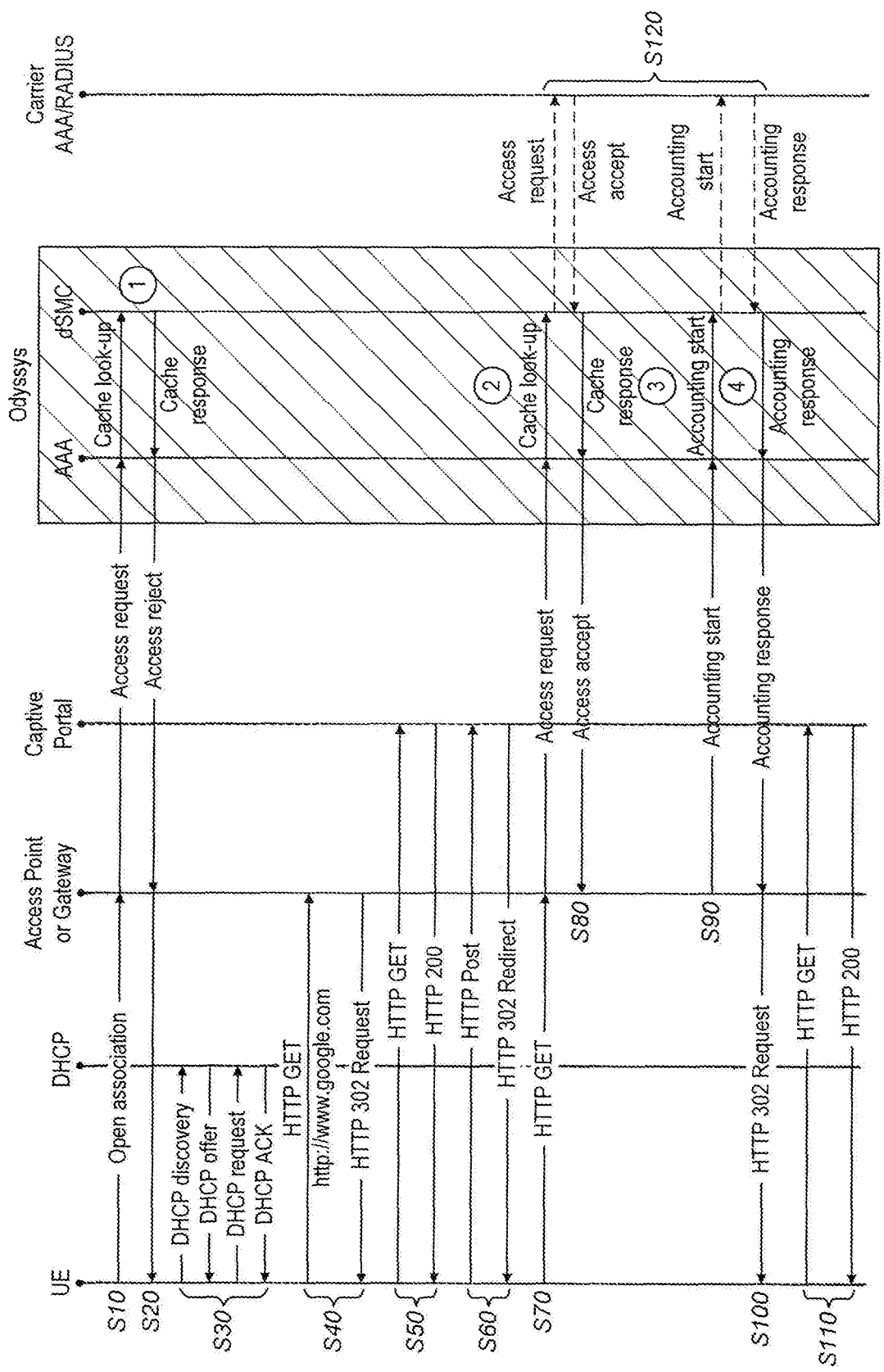
FIG. 4 schematically illustrates a network access messaging sequence according to and embodiment of the invention, using a RADIUS protocol.

Referring to FIG. 4, here is shown a schematic representation of a network access messaging sequence according to an embodiment of the invention, such as that illustrated in FIG. 6. Fore example, the messaging sequence of FIG. 4 may be implemented between the client device (UE) and the RADIUS server of the third network when the client device has roamed from the first network into the second network, and request continued access to the services of the third network.

Initially, at step S10, (this step is optional), the client device (UE) sends an 'Open Association' message to the network access point/gateway of the second network. The Access point reacts to this by transmitting an 'Access Request' message to the local RADIUS server (B) of the second network which reacts by searching the dSMC to see if the dSMC already has a record for the authentication request. The result may be returned to the UA at step S20. These two steps can optionally be used to start updating the dSMC from the upstream Carrier AAA.

Figure 1A:
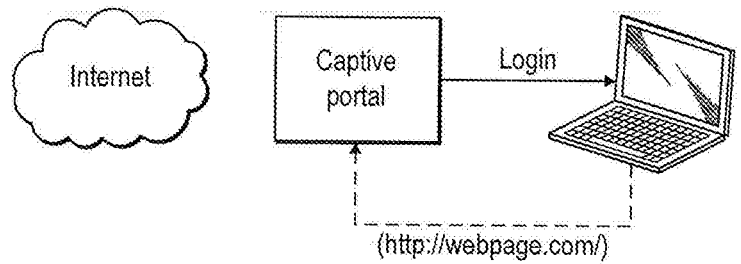
FIGS. 1A, 1B and 1C schematically illustrate the process of network access authentication according the 'captive portal' model.
Figure 1B:
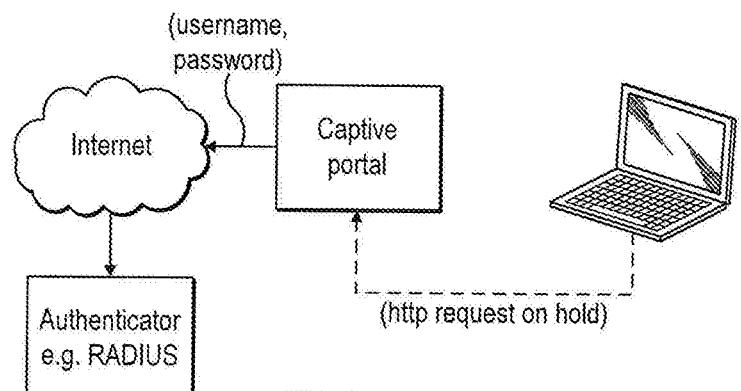
Figure 1C:
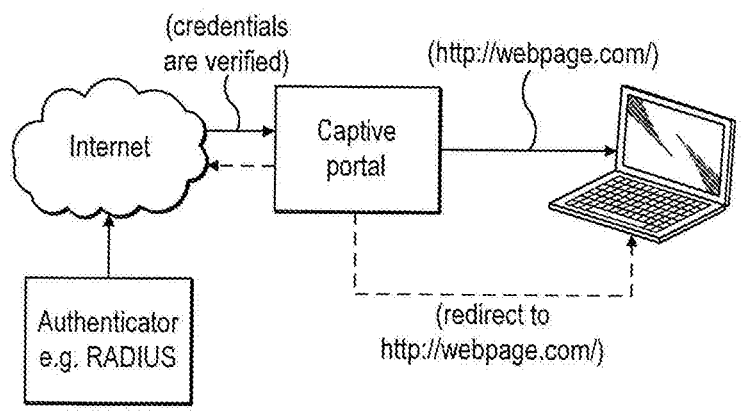
Figure 2:
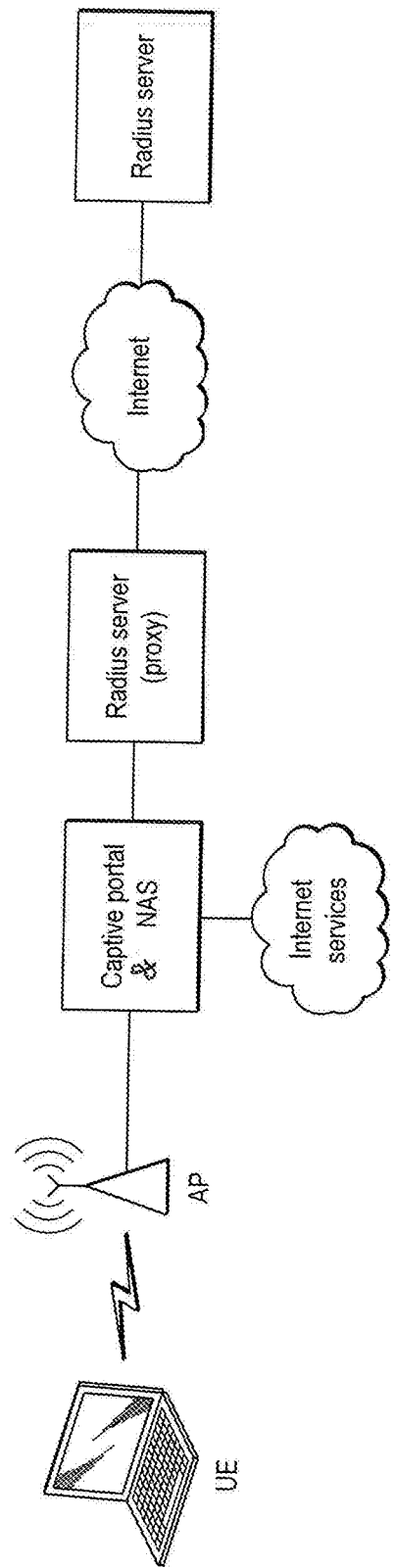
FIG. 2 schematically illustrates the use of a proxy RADIUS server in connection with a captive portal and network access server, to obtain authentication via a remote RADIUS server.

At steps S30 to S60, the client device (UE) performs well-known DHCP and HTTP GET messaging sequences with the local DHCP server, the network Access Point and the local Captive Portal according to known techniques such as those discussed with reference to FIG. 1A to 1C, above. These include, at step S30, a sequence of DHCP: 'Discovery; 'Offer'; 'Request'; 'Acknowledgement', messages between the UE messages the local DHCP server. At step S40, the UE messages the local network Access Point (e.g. HTTP GET; http://www.google.com) which responds to the UE message (e.g. HTTP 302 Redirect; https://portals.odyssys.net/account/captivePortal/123456) by redirecting the UE to a captive portal, which takes place at step S50 (e.g. HTTP GET; https://portals.odyssys.net/account/captivePortal/123456 from UE to captive portal; HTTP 200 message to UE from captive portal).

At step S70, the local AAA/RADIUS ('B') of the second network, with attached dSMC, receives an authentication request (e.g. HTTP GET AP/GW UAM Auth URL) from the client device (UE) via the access-point (AP) or gateway (GW) and, in reaction to that, searches inside its secure cache for the subscriber USER-NAME and/or CALLING-STATION-ID data for that UE. This data corresponds to the client device identity data. This data is previously stored there by the RADIUS server of the second network ('B') from the RADIUS server of the third network while/when the RADIUS server of the third network has/had accepted an earlier access request from the UE, whilst the UE was accessing the third network via the second network (i.e. via server 'A'). If the client device identity data remains present within the dSMC, because the time at which the authentication request is received by the dSMC is not later than the end of the time period after which the client device identity data is to be deleted from the dSMC (i.e. it is past the 'to forget (TTF)'), then, at step S80, an ACCESS-ACCEPT message is issued to the UE from the RADIUS server ('B') of the Access Point of the second network. The RADIUS server ('B') may be arranged to delete a stored client identity data item from its dSMC upon expiry of the shorter time period from amongst the time period defined by a Time-to-Forget (TTF) time value and the Time-to-Renew (TTR) time value if both values have been stored there from the RADIUS server of the third network. This acceptance message is transmitted no matter what the password data provided from the UE is. The ACCESS-ACCEPT message is returned to the UE along with any RADIUS attributes originally received from the RADIUS server of the third network (i.e. the carrier's RADIUS server).

However, if the dSMC has no record for the USERNAME or CALLING-STATION-ID, because that data has been deleted (e.g. the time to renew (TTR) or TTF has expired, whichever if the sooner) then the RADIUS server of the second network is arranged to I proxy the access request to the RADIUS server of the third network (i.e. to the Carrier's AAA, e.g. RADIUS).

In much a similar way to the ACCESS-ACCEPT messaging sequence between the UE and the RADIUS server ('B') of the second network, a messaging sequence comprising the ACCOUNTING-START, at step S90, and ACCOUNTING-RESPONSE, at step S100, begins between the UE and the RADIUS server ('B') of the second network via the access point (AP) or gateway (GW), (e.g. HTTP 302 Redirect; https://portals.odyssys.net/account/captivePortal/successpage). This begins immediately, from the RADIUS server of the second network. A lazy update is also issued from the RADIUS server of the second network to the RADIUS server of the third network (i.e. upstream carrier). Communication (S110) between the UE and the captive portal subsequently allows the UE to access the required resource of the desired carrier resource after authentication has taken place (e.g. HTTP GET; https://portals.odyssys.net/account/captivePortal/successpage), and HTTP 200).

The RADIUS of the third network has full knowledge of the ACCESS-ACCEPT by receiving the ACCOUNTING-START and all subsequent accounting packets, sent from the dSMC.

The improvement of the distributed secure memory cache and the time-limited trust data/messages allow for an improved user experience when or where latency between a local RADIUS server of a local network, and the upstream carrier RADIUS server of a remote network, are involved.

Figure 3:
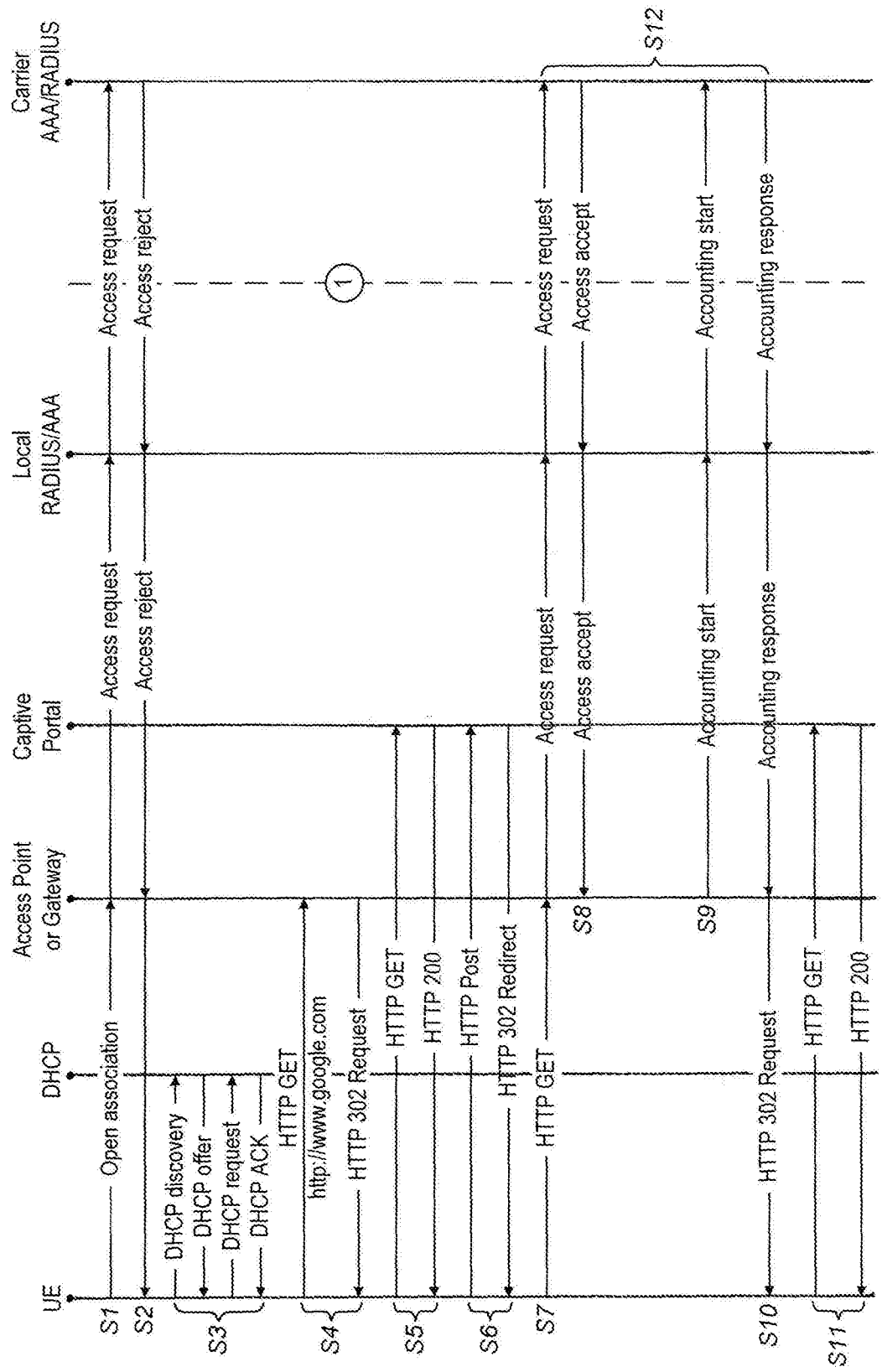
FIG. 3 schematically illustrates a network access messaging sequence according to a RADIUS protocol.

The messaging sequence at step (S120) can be conducted (sending/receiving between the RADIUS server of the second network and that of the third network) asynchronously relative to the messaging sequence, at steps (S80) to (S100), conducted between the RADIUS server of the second network and the UE. Thus, they need not hold-up any authentication request in the manner that an authentication request is delayed by the synchronous messaging sequence at steps (S12) of FIG. 3.

Where EAP is concerned the outer authentication may be required to terminate its tunnel on the local RADIUS server so that the inner authentication can be seen by the local RADIUS server, via the dSMC, to match the USERNAME and/or CALLING-STATION-ID. This means the local RADIUS server does not need to read/process or store the PASSWORD. Authentications may be conducted within the trust time period (expiry data item), based of the USERNAME and/or CALLING-STATION-ID. Where Free Internet, for example, is used, the trust time period (expiry data item) could be quiet high, if desired, or where a carrier charges they may wish to lower the trust time period (expiry data item). The balance is a trade off between end to end lookups (slower) against trust responses (faster). A carrier may place the dSMC out in remote countries or locations, and/or where needed, in a distributed fashion, knowing the data held in them will expire based on the trust time period (expiry data item) and that no user passwords needs to be stored in the dSMC. A dSMC can be configured and looked after by the carrier or the local provider and managed via a simple, intuitive, built in web GUI. Data to and from the dSCM may be protected in transit via standards based IPSEC.

The invention claimed is:

1. A method for authenticating a client device in a communications network amongst a plurality of communications network access points, including:

providing a first authentication server apparatus for a first communications network and a further authentication server apparatus for each one of a plurality of respective further communications network access points;

storing in a first data store, by the first authentication server apparatus, a client identity data item identifying the client device and an expiry data item identifying an expiry time associated with the client identity data item, and transmitting the client identity data item and the expiry data item to the further authentication server apparatus of each of said further communications network access points;
storing in a further data store, by each further authentication server apparatus, the received client identity data item and expiry data item and deleting the stored client identity data item from the further data store upon expiry of a time period defined by said expiry data item;
receiving, by any given said further authentication server apparatus, a request from said client device for access to the first communications network and, on condition that said client identity data item remains stored in the further data store thereof, authenticating the client device by performing authentication communications with the first authentication server apparatus asynchronously with respect to authentication communications with the client device.

2. A method according to claim 1 including receiving, by the given further authentication server apparatus, a password from the user device, wherein:
if said client identity data item remains stored in the further data store said authenticating the client device is not conditional upon verification of the password; and
if said client identity data item does not remain stored in the further data store said authenticating the client device is conditional upon verification of the password.

3. A method according to claim 1 wherein said authenticating the client device includes performing authentication communications according to an AAA (Authentication, Authorisation and Accounting) protocol or a RADIUS protocol (Remote Authentication Dial In User Service).

4. A method according to claim 3 wherein:
said authentication communications with the first authentication server apparatus include transmitting an Access Request communication to the first authentication server apparatus and receiving an Access Accept communication from the first authentication server.

5. A method according to claim 3 wherein:
said authentication communications with the first authentication server apparatus include transmitting an Accounting Start communication to the first authentication server apparatus and receiving an Accounting Response communication from the first authentication server.

6. A method according to claim 3 wherein:
said authentication communications with the client device include receiving an Access Request communication from the client device and transmitting an Access Accept communication to the client device.

7. A method according to claim 3 wherein:
said authentication communications with the client device include receiving an Accounting Start communication from the client device and transmitting an Accounting Response communication to the client device.

8. A method according to claim 1 wherein the client identity data item comprises any one or more of: a username; information identifying the client device (e.g. a calling-station-ID).

9. A method according to claim 1 wherein the expiry data item comprises any one or more of: a value representing a time or time point; a value representing date; a value representing an interval of time.

10. A method according to claim 9 in which the expiry data item comprises a first time value which defines how much time the further authentication server apparatus must provide for performing the authentication communications with the first authentication server apparatus, asynchronously with respect to authentication communications with the client device.

11. A method according to claim 9 in which the expiry data item comprises a second time value which defines when the further authentication server apparatus must delete the stored client identity data item from the further data store thereof.

12. A method according to claim 11 wherein said deleting includes deleting the stored client identity data item from the further data store upon expiry of a time period defined by either one of, or both of: the first time value; the second time value.

13. One or more computers programmed with computer program including instructions arranged, when executed, to implement the method according to claim 1.

14. A network of computers programmed with a computer program including instructions arranged, when executed, to implement the method according to claim 1.

15. A network communications apparatus for authenticating a client device in a communications network amongst a plurality of communications network access points, including:
a first authentication server apparatus for a first communications network arranged in communication with a further authentication server apparatus for each one of a plurality of respective further communications network access points;
a first data store arranged in communication with the first authentication server apparatus arranged for storing a client identity data item identifying the client device and an expiry data item identifying an expiry time associated with the client identity data item, the first authentication server apparatus being arranged to transmit the client identity data item and the expiry data item to the further authentication server apparatus of each of said further communications network access points;
a plurality of further data stores arranged in communication with a respective further authentication server apparatus for storing a client identity data item and an expiry data item transmitted from the first authentication server apparatus, each further authentication server apparatus being arranged for deleting a stored client identity data item from the respective further data store upon expiry of a time period defined by said expiry data item;
wherein each said further authentication server apparatus is operable to receive a request from said client device for access to the first communications network and, on condition that said client identity data item remains stored in the further data store thereof, to authenticate the client device by performing authentication communications with the first authentication server apparatus asynchronously with respect to authentication communications with the client device.

16. A network communications apparatus according to claim 15 in which each further authentication server apparatus is arranged to receive a password from the user device, wherein:
if said client identity data item remains stored in the further data store said authenticating the client device is not conditional upon verification of the password; and
if said client identity data item does not remain stored in the further data store said authenticating the client device is conditional upon verification of the password.

17. A network communications apparatus according to claim 15 in which said authenticating the client device includes performing authentication communications according to an AAA (Authentication, Authorisation and Accounting) protocol or a RADIUS protocol (Remote Authentication Dial In User Service).

18. A network communications apparatus according to claim 17 wherein:
said authentication communications with the first authentication server apparatus include transmitting an Access Request communication to the first authentication server apparatus and receiving an Access Accept communication from the first authentication server.

19. A network communications apparatus according to claim 17 wherein:
said authentication communications with the first authentication server apparatus include transmitting an Accounting Start communication to the first authentication server apparatus and receiving an Accounting Response communication from the first authentication server.

20. A network communications apparatus according to claim 17 wherein:
said authentication communications with the client device includes receiving an Access Request communication from the client device and transmitting an Access Accept communication to the client device.

21. A network communications apparatus according to claim 17 wherein:
said authentication communications with the client device includes receiving an Accounting Start communication from the client device and transmitting an Accounting Response communication to the client device.

22. A network communications apparatus according to claim 15 wherein the client identity data item comprises any one or more of: a username;
information identifying the client device (e.g. a calling-station-ID).

23. A network communications apparatus according to claim 15 wherein the expiry data item comprises a first time value which defines how much time the further authentication server apparatus must provide for performing the authentication communications with the first authentication server apparatus, asynchronously with respect to authentication communications with the client device.

24. A network communications apparatus according to claim 15 wherein the expiry data item comprises a second time value which defines when the further authentication server apparatus must delete the stored client identity data item from the further data store thereof.

25. A network communications apparatus according to claim 24 wherein said deleting includes deleting the stored client identity data item from the further data store upon expiry of a time period defined by either one of, or both of: the first time value; the second time value.

26. A network communications apparatus for authenticating a client device in a communications network amongst a plurality of communications network access points, including:
a first authentication server apparatus for a first communications network adapted and arranged for network communication with a further authentication server apparatus for each one of a plurality of respective further communications network access points;
a first data store arranged in network communication with the first authentication server apparatus arranged for storing a client identity data item identifying the client device and an expiry data item identifying an expiry time associated with the client identity data item for use in deleting the client identity data item from a further data store upon expiry of a time period defined by said expiry data item, the first authentication server apparatus being arranged to transmit the client identity data item and the expiry data item to a said further authentication server apparatus of each of said further communications network access points for storage in a said further data store thereof;
wherein the first authentication server is arranged to authenticate the client device via a said further authentication server apparatus by performing authentication communications with the further authentication server apparatus asynchronously with respect to authentication communications between the client device and the further authentication server while said client identity data item remains stored in the further data store thereof.

27. A network communications apparatus according to claim 26 in which said authenticating the client device includes performing authentication communications according to an AAA (Authentication, Authorisation and Accounting) protocol or a RADIUS protocol (Remote Authentication Dial In User Service).

28. A network communications apparatus according to claim 26 wherein the client identity data item comprises any one or more of: a username;
information identifying the client device (e.g. a calling-station-ID).

29. A network communications apparatus according to claim 26 wherein the expiry data item comprises a first time value which defines how much time the further authentication server apparatus must provide for performing the authentication communications with the first authentication server apparatus, asynchronously with respect to authentication communications with the client device.

30. A network communications apparatus according to claim 26 wherein the expiry data item comprises a second time value which defines when the further authentication server apparatus must delete the stored client identity data item from the further data store thereof.

31. A network communications apparatus for authenticating a client device in a communications network amongst a plurality of communications network access points, including:
a first authentication server apparatus for a communications network access point adapted and arranged for network communication with a second authentication server apparatus for a second communications network access point;
a data store arranged in communication with the first authentication server apparatus and arranged for storing a client identity data item identifying the client device and an expiry data item identifying an expiry time associated with the client identity data item, the first authentication server apparatus being arranged for deleting a stored client identity data item from the data store upon expiry of a time period defined by said expiry data item;
the first authentication server apparatus is arranged to receive the client identity data item and the expiry data item transmitted from said second authentication server apparatus for storage in said data store;
wherein the first authentication server is arranged to obtain authentication of the client device via said second authentication server apparatus by performing authentication communications with the second authentication server apparatus asynchronously with respect to authentication communications between the client device and the first authentication server while said client identity data item remains stored in the data store.

32. A network communications apparatus according to claim 31 in which the first authentication server apparatus is arranged to receive a password from the user device, wherein:
- if said client identity data item remains stored in the data store said authenticating the client device is not conditional upon verification of the password; and
- if said client identity data item does not remain stored in the data store said authenticating the client device is conditional upon verification of the password.

33. A network communications apparatus according to claim 31 in which said authenticating the client device includes performing authentication communications according to an AAA (Authentication, Authorisation and Accounting) protocol or a RADIUS protocol (Remote Authentication Dial In User Service).

34. A network communications apparatus according to claim 31 wherein the client identity data item comprises any one or more of: a username;
information identifying the client device (e.g. a calling-station-ID).

35. A network communications apparatus according to claim 31 wherein the expiry data item comprises a first time value which defines how much time the first authentication server apparatus must provide for performing the authentication communications with the second authentication server apparatus, asynchronously with respect to authentication communications with the client device.

36. A network communications apparatus according to claim 31 wherein the expiry data item comprises a second time value which defines when the first authentication server apparatus must delete the stored client identity data item from the data store thereof.

37. A network communications apparatus according to claim 36 wherein said deleting includes deleting the stored client identity data item from the further data store upon expiry of a time period defined by either one of, or both of: the first time value; the second time value.

\* \* \* \* \*